May 12, 1925.
C. DEVERALL
HOMOGENIZER GAUGE
Filed Nov. 11, 1922
1,537,338
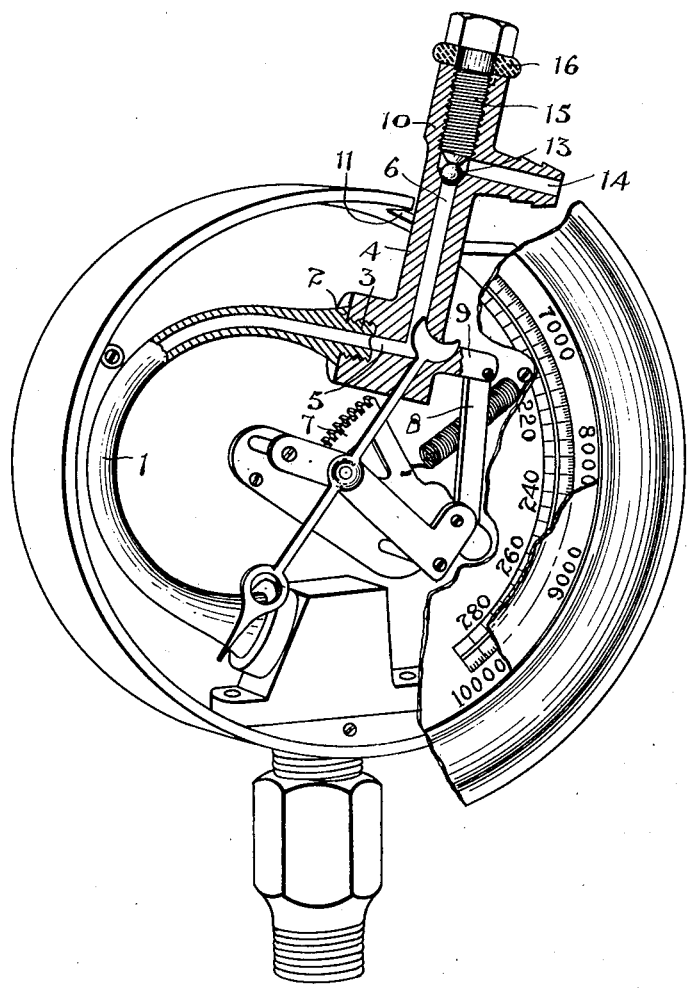
Inventor.
Charles Deverall Patented May 12, 1925.

1,537,338

UNITED STATES PATENT OFFICE.

CHARLES DEVERALL, OF TORONTO, ONTARIO, CANADA, ASSIGNOR TO THE JAMES MORRISON BRASS MANUFACTURING COMPANY, LIMITED, OF TORONTO, CANADA.

HOMOGENIZER GAUGE.

Application filed November 11, 1922. Serial No. 600,386.

*To all whom it may concern:*

Be it known that I, CHARLES DEVERALL, a subject of the King of Great Britain, and resident of the city of Toronto, county of York, Province of Ontario, in the Dominion of Canada, have invented certain new and useful Improvements in a Homogenizer Gauge, described in the following specification and illustrated in the accompanying drawings, that form part of the same.

The principal objects of the invention are, to maintain the accuracy of the pressure gauge used in homogenizing milk, and to eliminate the unsanitary conditions that exist in the use of present forms of gauges, and to devise a gauge in which the spring tube may be thoroughly cleansed.

The principal feature of the invention consists in arranging an outlet at the dead end of the tube spring in a pressure gauge so that it may be flushed out.

The drawing is a perspective part sectional view of my improved form of gauge.

In the use of pressure gauges in milk homogenizing plants, the fouling of the tube spring of the gauge has been a very detrimental factor and on account of the tube spring being a dead end a certain amount of milk does not drain out and it of course sours and after successive uses the spring becomes very foul and finally fills up so that it becomes very inaccurate in its registration of pressures. Both of these difficulties are overcome by the provision of an outlet at the dead end of the spring.

In the example herein shown the tube spring 1 is formed with a shoulder 2 and reduced threaded end 3. Upon this threaded end is secured an angle member 4 having an opening 5 therethrough communicating with the opening 6 in the tube.

The angle member 4 is connected to the gauge quadrant 7 by a link 8 connected to a lug 9 on the angle member. The hollow stem 10 of the angle member extends outwardly through an opening 11 in the gauge casing and it is provided with a valve seat closed by a ball valve 13.

A lateral opening 14 leads from the hollow stem above the valve and is adapted to receive a tube for conducting the washing water flushed through the opening.

Above the ball valve 13 is arranged a set screw 15 which engages the ball and holds it tightly to its seat. Beneath the head of the set screw is arranged a heavy resilient gasket 16 preferably of fine rubber. This gasket will expand upon the loosening of the set screw and will maintain a water tight joint at the end of the hollow stem when the valve is open. This obviates the necessity for a packing gland.

The device is extremely simple but it is very effective and enables the gauge to be flushed out after every operation of the plant while the other parts of the machine are being cleaned.

What I claim as my invention is:—

1. A homogenizer gauge having a hollow stem extending outwardly from the free end of the tube spring, and a valve closing said hollow stem.

2. A homogenizer gauge having a tube spring formed with an open end, an angular tubular extension secured on the open end of the tube spring, said extension having a discharge opening, a valve seat arranged in a hollow stem extension, a ball valve adapted to engage the valve seat, a set screw threaded in the extension and adapted to hold the ball valve to its seat, and a flexible packing gasket surrounding the stem of the set screw under the head.

CHARLES DEVERALL.